United States Patent Office 2,816,036
Patented Dec. 10, 1957

2,816,036

CHEESE MANUFACTURE

Albrecht M. Lederer, New York, N. Y., assignor to Swift & Company, Chicago, Ill., a corporation of Illinois No Drawing. Application May 1, 1953,
Serial No. 352,595

4 Claims. (Cl. 99—116)

The present invention relates in general to the preparation of cheese. More specifically, the invention is directed to a new process of preparing cheese wherein the aging time required is materially reduced.

Heretofore, the aging of American or Cheddar cheese has required at least a period of about six weeks before any appreciable cheese flavor is developed. Such an aging or ripening period results in the production of a mild-flavored cheese whereas, three months of aging produces a medium-flavored cheese. As would be expected, extension of the aging period results in a more highly-flavored product. Where six or eight months of aging is utilized the resultant flavor is that specified as an aged-flavor. As can readily be seen, the aging periods required are relatively long and, therefore, necessitate the utilization of a great amount of storage space.

The conventional process for producing American or Cheddar cheese involves the setting of selected milk wherein a curd is formed. The curd is cut and cooked and whey is removed therefrom. The curd is then cheddared, milled and salted before it is placed in cheese cloth-lined molds. Following this, the steps of pressing, removing from the press and surface drying are utilized so as to prepare the cheese for aging. The cheese is then dipped into hot paraffin and aged. The aging takes place at moderate temperatures, usually about 40° to 50° F. for a period of aging time required to produce the desired flavor in the cheese.

Generally speaking, the many steps required in the processing of green cheese up to the aging step do not require a considerable period of time. The bulk of the time involved in the process lies in the aging step.

It is therefore an object of this invention to substantially reduce the time required in the aging of cheese.

Another object is to produce a cheese of improved flavor and texture while realizing a considerable aging time reduction.

Other objects, not specifically set forth, will become apparent from the following detailed description.

Generally, the present invention comprises the forming of green cheese blocks, quick freezing the so-formed blocks, maintaining the quick-frozen blocks at the quick freezing temperature for a specified time, and thereafter aging the cheese so-treated. It has been found that the aging time is thereby materially reduced while the resultant flavor and texture is improved.

According to the teachings of the present invention, green cheese, produced in accordance with well-known practices, is quick frozen after being formed into blocks prior to the conventional aging step. This quick freezing is preferably carried out at approximately —10° F., but other temperatures may be used which accomplish the same results. Following the quick freezing step the frozen blocks of green cheese are then held in the quick freezing or hardening room under the quick freezing conditions for a specified time, preferably from 60 to 180 minutes. The blocks are then transferred to an aging room wherein the temperature is maintained slightly above freezing, preferably from 45° to 60° F. Upon inspection of the cheese, after aging for a very short period when compared to conventional treatment, it is found that the cheese exhibits a very noticeable improvement in body, flavor and texture.

In an attempt to explain the highly desirable results realized from such a treatment it is believed, though not definitely established, that the quick freezing and tempering of the green cheese breaks down the protein structures whereby the aging time is substantially accelerated.

The following examples are set forth for purposes of illustration only and are not to be construed as limiting to the present invention.

Green Cheddar cheese was prepared in ten pound blocks which were placed in a hardening room and quick frozen at approximately —10° F. A portion of the blocks were removed at different intervals from the hardening room and transferred to a tempering and aging room. After an aging period of nine days for all of the blocks at a temperature within the range of from about 45° to 60° F., the blocks were tested with respect to body, texture, flavor and chemical breakdown. These tests are conventional in the art and utilize organoleptic methods in judging the cheese. The grading was based on 0.1 of a point having a total range of numbers from 1 to 4. The grading system utilized established the score of 1 as very good, 2 as good, 3 was poor, and 4 was unsatisfactory. The following comparative table results from the score of the tests recorded for each sample held in the hardening room for a different length of time.

| Time in Hardening Room, Minutes | Score after 9 Days of Aging | | | |
| --- | --- | --- | --- | --- |
|  | Body | Texture | Flavor | Chemical Breakdown |
| 30 | 1 | 1.1 | 1.0 | 1.0 |
| 60 | 1 | 1.2 | 1.1 | 1.1 |
| 90 | 1 | 1.3 | 1.2 | 1.2 |
| 120 | 1 | 1.1 | 1.1 | 1.1 |
| 180 | 1 | 1.4 | 1.3 | 1.3 |

As can be seen from the above results the hardened cheese showed very high scores after only 9 days of aging. Cheese samples treated in a conventional manner without the advantage of a prefreezing treatment would show much lower scores after only 9 days of aging due to the fact that cheese prepared in the conventional manner requires at least about 6 weeks of aging before the body, texture and flavor scores are in the good or very good range. The body, texture and flavor properties in cheese are clearly very important and such properties have not heretofore shown acceptable development in such a short period of time.

In the above tests the cheese was paraffined immediately after its removal from the hardening room. The paraffin was retained on the cheese during the subsequent tempering and aging. It was apparent that there is some difficulty present in paraffining the quick frozen cheese. In view of this difficulty it has been found that it may be considered more desirable to postpone paraffining until the product is somewhat drier, due to aging, and a rind is formed on the surface. Such a condition will normally be present about six days after the product is transferred to the tempering and aging room.

Obviously, many modifications and variations of the invention as hereinbefore set forth may be made without departing from the spirit and scope thereof, and therefore only such limitations should be imposed as are indicated in the appended claims.

I claim:
1. The method of accelerating aging of Cheddar cheese which comprises: quick freezing green Cheddar cheese, maintaining the cheese under quick freezing conditions for approximately 60 to 180 minutes, and thereafter aging the cheese whereby the time of aging is substantially reduced.
2. The method of accelerating aging of Cheddar cheese which comprises: quick-freezing green Cheddar cheese to a temperature less than about $-10°$ F., maintaining said cheese at about said quick-freezing temperature for between about 60 and 180 minutes, tempering the cheese to aging temperatures, and thereafter aging the cheese for at least about nine days.
3. The method of accelerating aging of Cheddar cheese which comprises: quick-freezing green Cheddar cheese to less than about $-10°$ F., maintaining said cheese at about said quick-freezing temperature for between about 60 and 180 minutes, tempering said cheese to between about 45 and 60° F. and thereafter aging said cheese for at least about nine days at the latter temperature.
4. In a process for manufacturing Cheddar cheese wherein the whey is separated from the curd, the curd is milled, salted and placed in forms, and the product aged in an aging room maintained above cheese freezing temperatures, the improvement comprising: quick-freezing the curd prior to the aging step and maintaining the curd at about said quick-freezing temperature for at least about 60 minutes.

References Cited in the file of this patent

UNITED STATES PATENTS

| | | |
|---|---|---|
| Re. 18,364 | Tival | Feb. 23, 1932 |
| 1,970,956 | Elser | Aug. 21, 1934 |
| 1,997,866 | Irvin | Apr. 16, 1935 |
| 2,066,302 | Reichel | Dec. 29, 1936 |
| 2,225,627 | Flosdorf | Dec. 24, 1940 |
| 2,446,550 | North et al. | Aug. 10, 1948 |
| 2,576,597 | Gootgeld | Nov. 27, 1951 |

OTHER REFERENCES

U. S. Dept. of Agriculture Bulletin 608, March 6, 1918, page 13.

Kosikowsky et al.: Journal of Dairy Science, September 1949, page 792.

U. S. Dept. of Agriculture, Bureau of Animal Industry, Bulletin 49, pages 11 and 36.